Figure 1:
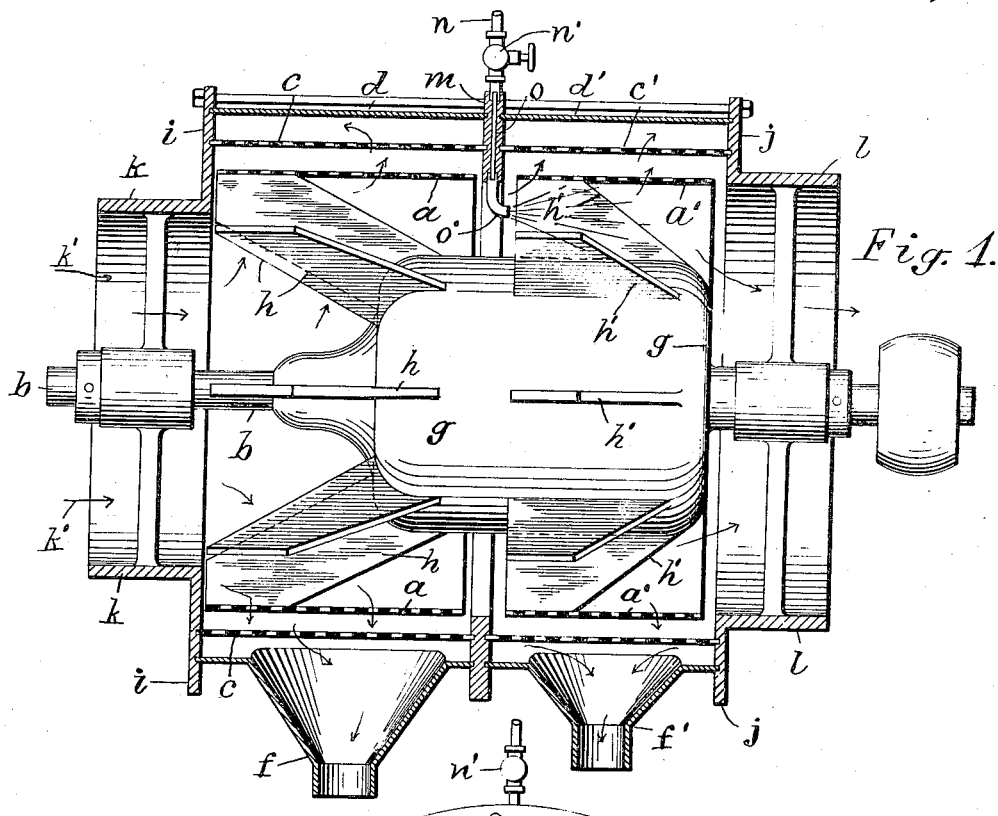

W. J. BALDWIN.
DUST SEPARATOR.
APPLICATION FILED MAR. 14, 1921.

1,415,294.

Patented May 9, 1922.

INVENTOR.
William J. Baldwin
BY
Thomas S. Crowe
ATTORNEY

UNITED STATES PATENT OFFICE.

WILLIAM J. BALDWIN, OF BROOKLYN, NEW YORK.

DUST SEPARATOR.

1,415,294.           Specification of Letters Patent.           Patented May 9, 1922.

Application filed March 14, 1921. Serial No. 452,223.

*To all whom it may concern:*

Be it known that I, WILLIAM J. BALDWIN, a citizen of the United States, residing at 151 Halsey Street, Brooklyn, county of Kings, and State of New York, have invented certain new and useful Improvements in Dust Separators, fully described and represented in the following specification and the accompanying drawings, forming a part of the same.

This invention relates to certain improvements in the construction of apparatus for separating dust from air and gases as hereinafter set forth.

It is known that dust may be separated from air by subjecting the dust-laden air to centrifugal force within a cylindrical screen, through which the dust is driven and outside of which it may be collected while the cleansed air passes from the end of the screen.

It is also well known that in most cases the coarser impurities in the gas can be readily separated in a dry state by a suitable operation of centrifugal force, such dry treatment being preferable whenever it can be applied successfully.

Such dry separation is necessary in many cases, where the matter suspended in the gas is of value and is separated from the gas chiefly for the purpose of recovering such material.

An example of such material is bronze powder, which becomes diffused in the atmosphere in the pulverizing operation and which is of considerable value, so that it is desired as far as possible, to separate such bronze powder from the air without applying moisture, as the moistened product requires to be dried and repowdered. It is also well known that the finer particles of dust or foreign substances suspended in the dust or foreign substances suspended in the gas can be most efficiently removed by supplying moisture to the gas during the separating operation, and thus forming agglomerates which easily separate from the gas.

The present invention furnishes a combination of wet and dry treatments by which a great proportion of the suspended material is separated from the gas without moisture, and thus recovered without any change in its condition or properties. The gas containing the remainder of the material, which cannot be efficiently separated in a dry condition, is subjected in a continuous process to the wet treatment whose principal effect is to purify the air, and incidentally to recover a certain proportion of the material.

The invention consists of primary and secondary rotary cylindrical screens wholly open at the ends to permit the direct passage of air therethrough, and supported upon a central shaft to rotate therewith, and the secondary screen provided with means for supplying moisture to the interior of said screen.

The invention also includes other details of construction which may be referred to herein.

For conciseness of description, the term "gas" will be employed to include the atmospheric air, and the term "dust" to include all materials whether solid, gaseous, or fluid, to be separated from the gas.

Figure 2:
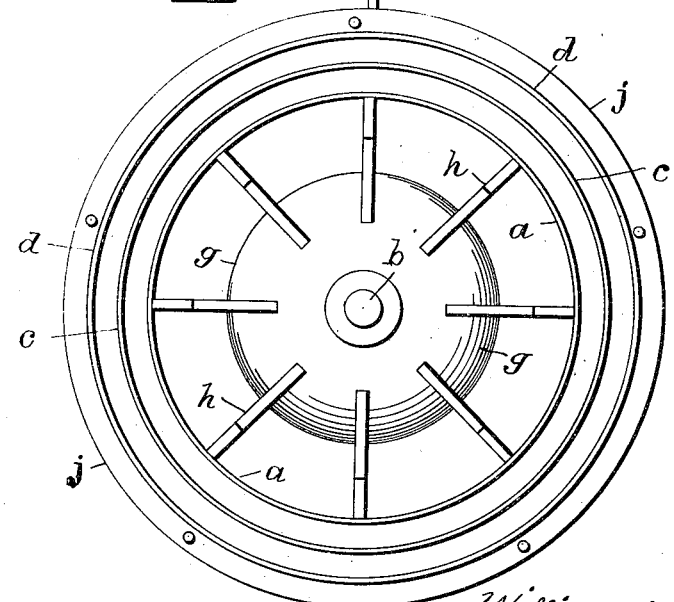

The invention will be understood by reference to the annexed drawing, in which Fig. 1 is a longitudinal section of a casing and separating screens with an elevation of the drum and fan-blades therein; and Fig. 2 is an end view of the apparatus with the front head and shaft-bearing removed.

The drawing illustrates an apparatus provided with two hollow rotary cylindrical screens $a$, $a'$, attached to the shaft $b$ so as to rotate together, the primary screen operating first upon the material in the gas in a dry condition, and the gas then passing directly into the secondary screen where fluid is sprayed into the gas and the remaining material formed into agglomerates which are easily separated by the secondary screen. The shaft is rotated by any suitable motor.

These revolving screens, as is common in such separators, are surrounded by stationary perforated shells $c$, $c'$, to which the separated material is first discharged, and such stationary shells are enclosed by casings $d$, $d'$, forming a "still" or "quiet" space, in which the separated material passes to outlet-nozzles $f$, $f'$, which may discharge the dust to any desired point.

The rotary screens $a$, $a'$ are connected to a drum $g$ upon the shaft $b$ by fan-blades $h$, and heads $i$ and $j$ are fitted to opposite ends of the shells and formed respectively with inlet $k$ and outlet $l$.

The outer edges of the fan-blades are sloped toward the screens $a$, $a'$, thus narrowing the contact of the blades with the screens and leaves a considerable portion of each screen free from the blades, within which portion the air is not positively propelled as is the air between the blades. This promotes the radial movement of the dust particles to escape through the screen.

The drum extends to the outlet $l$ but clears the inlet for a considerable space, which fully admits the gas to enter within the screen.

The gas to be purified enters the inlet $k$ as shown by arrows $k'$, and is rotated by the fan-blades $h$, which generates the centrifugal force required to drive the impurities through the meshes of the rotary screens.

These fan-blades are attached only to the forward portion of each separating screen, leaving a considerable space around the drum without any means that directly agitate the air. The dust is thus freed to move radially toward and through the screen to enter the "quiet" spaces behind the same.

The drum considerably reduces the area of the passage through which the air escapes to the outlet $l$, such reduction of area serving to crowd the air more forcibly against the secondary screen $a'$ and thus facilitating the discharge of the material therethrough.

The rotary motion of the material discharged through the primary screen is arrested by the stationary shells $c$, $c'$, through which the separated material is forced by the centrifugally moving air-currents.

The rotary screens have their inner ends adjacent to one another, so that the air passes freely from the interior of the primary screen $a$ to the interior of the secondary screen $a'$, the inlet and outlet leading the air into the inside of the primary screen and discharging it from the inside of the secondary screen.

The drum extends partially across the space between the inner ends of the rotating screens and its reduction of the space within the screens tends to retain the gas in contact with the rotary screens, thus promoting the separation of the material from the gas.

A spray-pipe $n$ is connected by a cock $n'$ with a passage $o$ extended radially through the partition $m$, and its nozzle $o'$ is directed toward the interior of the secondary screen and sprays liquid of any desired character into the gas within such screen.

The gas moving from within one screen to the other is whirled around the drum by the fan-blades $h'$ carrying the secondary screen, and the spray is thus distributed within the whole interior of that screen.

The weight of the finer dust particles is thus greatly augmented and the centrifugal force and movement of such particles correspondingly increased, thus promoting their discharge to and through the rotating screen $a'$ and its surrounding shell $c'$.

In most cases a material proportion, as 60 or 70 per cent of the coarser particles can be separated from the gas by the dry treatment, and the second treatment with the necessary supply of liquid to the gas ther suffices to separate the remainder of the suspended material.

It will be observed that the annular partition $m$ wholly separates from one another the spaces encircling the two rotary screens and the dry and wet products from the two screens are thus collected and obtained separate from one another so that each may be employed for the purpose to which it is best adapted.

The apparatus shown herein is provided with a rotary shaft which carries fan-blades to generate centrifugal force and a movement of the gas toward the screens, but the construction is immaterial so far as the process is concerned, and the air may be subjected successively to dry and wet treatment by any suitable means without departing from the invention.

Having thus set forth the nature of the invention what is claimed herein is:

1. In an apparatus for separating gas from heavier materials, the combination, with an outer casing, of a shaft extended longitudinally within the same, primary and secondary cylindrical screens attached to the said shaft with open ends adjacent to one another for the free passage of gas, a drum upon the shaft arranged to clear the inlet of the primary screen for a considerable space, to freely admit the gas within said screen, and extended through the secondary screen, fan-blades connecting the drum with the screens and operating to propel the gas into and through the interiors of the two screens successively, means for spraying moisture into the gas between the secondary screen and drum, and the drum operating to crowd the air toward the secondary screen and discharge the agglomerates therethrough.

2. In an apparatus for separating gas from heavier materials, the combination, with an outer casing, of a shaft extended longitudinally within the same, primary and secondary rotary cylindrical screens attached to the said shaft with open ends adjacent to one another for the free passage of the gas, fan-blades rotated with the screens and operating to introduce the gas into the interiors of the two screens successively, and the screens operating to separate the heavier material and discharge it outwardly through the perforations therein.

3. In an apparatus for separating gas from heavier materials, the combination, with an outer casing, of a shaft extended longitudinally within the same, primary and secondary rotary cylindrical screens attached to the said shaft with collecting space outside of the same, and open ends adjacent to one another for the free passage of the gas, fan-blades or vanes rotated with the screens, means for spraying moisture into the gas within the secondary screen, to agglomerate the material upon the inner side of the said screen, and drive said agglomerates into the collecting space outside of said screen.

In testimony whereof I have hereunto set my hand.

WILLIAM J. BALDWIN.